Patented Apr. 30, 1940

2,198,874

UNITED STATES PATENT OFFICE 2,198,874

PREPARATION OF SYNTHETIC RESINS AND USE THEREOF

Eric Leighton Holmes, London, England, assignor, by mesne assignments, to The Permutit Company, New York, N. Y., a corporation of Delaware No Drawing. Application March 17, 1937, Serial No. 131,521. In Great Britain March 20, 1936

17 Claims. (Cl. 210—24)

This invention or discovery relates to the purification of water; and it comprises a method of removing anions from water wherein the water is passed in flowing contact with extensive surfaces of a granulated resin derived from a phenylene diamine and a carbohydrate of the saccharide class, the granular resin being occasionally regenerated by contact with an alkaline solution capable of removing the anions taken up; and it further comprises a method of preparing such a granular anion-removing material wherein a phenylene diamine is condensed with a carbohydrate of the saccharide class, formaldehyde or another non-sugar aldehyde being sometimes added to the reaction mixture and the gel produced is granulated to a size appropriate for use in pervious bed apparatus, often between 20 and 40 mesh; all as more fully hereinafter set forth and as claimed.

In the purification of water by zeolites the action is ordinarily an exchange of bases, the hardness giving bases of the water, lime and magnesia, being exchanged for soda contained in the zeolite. The zeolite is regenerated from time to time with a common salt solution. In more recent methods cations (bases) are removed from water by an acid regenerated zeolite, usually of carbonaceous material. Regeneration is then with an acid. Neither method is applicable to the removal of acids or anions from water. It is an achieved object of the present invention to provide means capable of removing anions from water.

To this end a granulated resinous material is prepared by reacting upon a phenylene diamine, either metaphenylene-diamine or a 5-alkyl-meta-phenylene-diamine with a carbohydrate of the saccharide class. The carbohydrate may be a mono- or a di-saccharide or a poly-saccharide, such as starch; a poly-saccharide capable of hydrolysis to give a mono- or di-saccharide. The reaction is performed with or without the addition of a non-sugar aldehyde such as formaldehyde. The sugars of the mono-saccharide class carry aldehyde or ketone groups and the reaction is presumed to be a condensation between this group and an amino group. In using higher saccharides in the operation it is believed that an hydrolysis into ordinary sugars carrying aldehyde or ketone groups takes place, but it is quite possible that direct condensation between the amino group and an hydroxyl group of the higher saccharide also takes place. The principal factors governing the choice of the saccharide are its ready availability and cheapness, glucose, (dextrose) sucrose and invert sugar being particularly suitable.

It is believed that the ion exchange properties of the resulting resin are due to the presence of the amino or condensed amino groups, in particular the free amino group, which may be present to a greater or less extent, and that the sugar residue plays no direct part in conferring these properties. On account of the relatively high molecular weight of sugar, a larger volume of the resin can be obtained by condensation with a given weight of the amine than would be the case if a substance of lower molecular weight were condensed with the same weight of amine. In water purification by ion exchange, surface actions of granular material exposed to flowing water are involved and volume considerations are important. The operating exchange value per unit volume of the resin is approximately the same as that of an amine-formaldehyde resin, and this, provided that the aldehyde is not too much in excess of that quantity required to yield a gel, coupled with the lower cost of the sugars used as starting materials leads to reduction in cost of production without any corresponding reduction in the efficiency of the product. It is often preferable, however, to use mixed resins derived from the condensation of meta-phenylene diamine or one of its 5-alkyl derivatives with a mixture of a sugar and formaldehyde. These mixed resins have very satisfactory physical properties and moreover the reaction leading to their formation can be carried out without the heating desirable to accelerate the reaction when a sugar alone is used.

As the resins are primarily intended for the treatment of water, it is essential that they should not be soluble in water. When the reaction has reached a certain stage, i. e. when the molecular weight of the resin reaches a certain value, the solution transforms itself into a gel, and this gel, besides being insoluble in water, has good mechanical properties rendering it very suitable for use in granular form as a filtering medium, particularly after it has been dried. When the base is caused to react with a sugar alone without the addition of a non-sugar aldehyde, a certain minimum quantity of the sugar is required in order that the solution may give an insoluble gel. This quantity, which varies somewhat with different sugars, is somewhat less than the theoretical quantity required to react with all the available base. The theoretical proportions would be two mols of the sugar to each mol of the base if any compound of the Schiff's base type were formed, while the minimum quantity leading to the formation of an insoluble gel as a rule will not be less than 1⅓ mols of sugar to each mol of the base. When a non-sugar aldehyde is used in addition to the sugar, there is no minimum quantity of sugar required to lead to gel formation provided enough of the non-sugar aldehyde is used, but there must be a certain quantity of sugar if the properties and advantages obtainable by the use of sugar are not to be submerged. This quantity may be defined for each particular sugar as at least 15 per cent of the minimum value necessary for the formation of an insoluble gel when that sugar is used alone.

At least one-third of the base should be neutralised by means of an acid at the beginning of the reaction. Not all acids are suitable, and it is found that if either the pure base or its normal sulphate is used the product is not produced in the form of a suitable gel, which can be converted into useful granules and has therefore little value for the purpose contemplated; secondary reactions take place if the nitrate is used and drying is carried out at too high a temperature.

In the preferred manner of carrying out the reaction in the case where no formaldehyde or other non-sugar aldehyde is used an aqueous solution of the hydrochloride of the base is made up and to this is added approximately the theoretical quantity of sugar solution. More than one sugar may of course be used, and in this case the total sugar added is sufficient to react with all the base, the proportion of the sugars being of little importance. The reaction can be effected by boiling the solution until it is transformed into an insoluble gel.

It is generally preferred to add some formaldehyde to react with the base because gelatin can then be obtained more readily. In this case it is convenient first to add the bulk of the sugar to the solution of the hydrochloride of the base and then to add the formaldehyde after leaving to stand for some time at the ordinary temperature. This leads to formation of the gel, and although the reaction with the sugar may not be completed at the ordinary temperature the subsequent drying of the gel appears to have the effect of taking the reaction to completion.

The resins produced will remove acids from solutions by base exchange or if saturated with one anion and then used for the treatment of a salt containing another anion will bring about an exchange of the anions. They are, of course, charged with the appropriate ion prior to use by treatment with a solution containing this ion and are regenerated as required from time to time.

In order that the invention may be more readily understood and easily carried into effect, some examples of the process will now be given.

Example I

A solution having the following composition was prepared:

| | Parts by weight |
|---|---|
| Meta-phenylene diamine hydrochloride | 18 |
| Glucose | 15 |
| Water | 240 |

This solution was boiled for 1½ hours and 10 parts by weight of 40 per cent formaldehyde were then added. The mixture gelled after boiling for 40 minutes and the gel was dried. The total yield was 28 parts by weight.

50 cc. of the gel were ground to a fineness such that the resultant granules would pass through a 20 mesh sieve but were retained by a 40 mesh sieve. The granules were soaked in a glass tube in 50 cc. of 5 per cent caustic soda solution for 16 hours and were then washed free of excess alkali with distilled water. N/100 hydrochloric acid solution was now passed through this bed of resin and 1400 cc. of the acid were so treated before the effluent became acidic and contained more than a small trace of chlorine ion.

Example II 15 parts by weight of glucose used in Example I were replaced by 35 parts by weight of glucose. Gelatin then occurred on boiling for 1⅓ hours without the addition of any formaldehyde.

Example III

A solution having the following composition was prepared:

| | Parts by weight |
|---|---|
| Meta-phenylene diamine hydrochloride | 37 |
| Levulose | 70 |
| Water | 400 |

After boiling this solution for 1½ hours 4 parts by weight of 40 per cent formaldehyde were added and gelation occurred after further boiling for 1¼ hours.

50 cc. of the dried product were comminuted to give a granular material and treated with alkali as in Example I. The product was capable of absorbing the acid from 2 litres of N/100 hydrochloric acid.

Example IV

A solution having the following composition was prepared:

| | Parts by weight |
|---|---|
| Meta-phenylene diamine hydrochloride | 25 |
| Sucrose | 25 |
| Water | 75 |

This solution was allowed to stand for two days and 18 parts by weight of 40 per cent formaldehyde solution was then added. The mixture gelled spontaneously without heating in 10 minutes. The gel was dried at 150° C.

A 50 cc. sample ground and treated with alkali, as in Example I, removed the acid from 1200 cc. of a 0.03 N solution of sulphuric acid.

Example V

A solution having the following composition was prepared:

| | Parts by weight |
|---|---|
| Meta-phenylene diamine hydrochloride | 20 |
| Invert sugar | 35 |
| Water | 200 |

The solution was refluxed for 1¾ hours and then 6 parts by weight of 40 per cent formaldehyde solution were added. Gelation occurred after further boiling for 10 minutes.

Example VI

A solution having the following composition was prepared:

| | Parts by weight |
|---|---|
| Meta-phenylene diamine hydrochloride | 20 |
| Starch | 50 |
| Water | 240 |

This solution was heated on a steam bath for 8 hours when it slowly gelled. The yield of resin after drying was 37 parts by weight.

*Example VII*

A solution having the following composition was prepared:

| | Parts by weight |
|---|---|
| Meta-phenylene diamine | 1 |
| Concentrated hydrochloric acid | 1 |
| Water | 2 |
| Glucose dissolved in 14 lbs of water | 1 |

This solution was boiled for 1½ hours and 1 part by weight of 40 per cent formaldehyde was added. The solution was again boiled and gelled in 40 minutes. The total yield of resin was 2 parts by weight.

I claim:

1. In the preparation of an insoluble resin in granular form for use in the treatment of water, reacting a member of the group consisting of the monosaccharides, disaccharides and bodies yielding a monosaccharide or disaccharide on hydrolysis with a member of the group consisting of metaphenylene diamine and the 5-alkyl derivatives thereof to produce a gel, drying the gel and granulating.

2. In the preparation of an insoluble resin in granular form for use in the treatment of water reacting a non-sugar aldehyde and a member of the group consisting of the monosaccharides, disaccharides and bodies yielding a monosaccharide or disaccharide on hydrolysis with a member of the group consisting of meta-phenylene diamine and the 5-alkyl derivatives thereof to produce a gel, drying the gel and granulating.

3. In the preparation of an insoluble resin in granular form for use in the treatment of water, reacting formaldehyde and a member of the group consisting of the monosaccharides, disaccharides and bodies yielding a monosaccharide or disaccharide on hydrolysis with a member of the group consisting of meta-phenylene diamine and the 5-alkyl derivatives thereof to produce a gel, drying the gel and granulating.

4. In the preparation of an insoluble resin in granular form for use in the treatment of water, the steps which comprise adding a sugar solution to a solution of meta-phenylene diamine hydrochloride, allowing reaction to take place, then adding a solution of formaldehyde whereby to form a gel, drying said gel and granulating.

5. In the preparation of an insoluble resin in granular form for use in the treatment of water in removal of anions, the steps which comprise reacting a member of the group consisting of the monosaccharides, disaccharides and bodies yielding a monosaccharide or disaccharide on hydrolysis with a member of the group consisting of meta-phenylene diamine and the 5-alkyl derivatives thereof whereby to form a resin, drying and granulating the resin, and treating said resin with an alkaline solution.

6. A cyclic process for the treatment of water containing acids or salts comprising flowing the water to be treated into contact with a bed of a granular resin prepared by reacting a substantial quantity of at least one carbohydrate selected from the group consisting of monosaccharides, disaccharides and substances yielding a monosaccharide or disaccharide on hydrolysis with one mol of an amine of the group consisting of meta-phenylene diamine and the 5-alkyl derivatives thereof, regenerating the resin with a solution of an electrolyte when its efficiency for treating the water becomes impaired, and flowing a further quantity of said water through a bed of the regenerated resin.

7. A cyclic process for removing acids and acidic bodies from water with a pervious water insoluble granular bed of a resin prepared by reacting at least 1⅓ mols of at least one carbohydrate selected from the group consisting of monosaccharides, disaccharides and substances yielding a monosaccharide or disaccharide on hydrolysis with one mol of an amine from the group consisting of meta-phenylene diamine and the 5-alkyl derivatives thereof which comprises, flowing the water through said bed until the acid removal properties of the bed are substantially impaired, regenerating the bed of resin with an alkaline solution, and flowing additional quantities of said water through the regenerated bed.

8. A cyclic process for removing acids and acidic bodies from water with a pervious water insoluble granular bed of a resin prepared by reacting a substantial quantity of at least one carbohydrate selected from the group consisting of monosaccharides, disaccharides and substances yielding a monosaccharide or disacharide on hydrolysis with one mol of an amine from the group consisting of meta-phenylene diamine and the 5-alkyl derivatives thereof and with a substantial quantity of a non-sugar aldehyde which comprises, flowing the water through said bed until the acid removal properties of the bed are substantially impaired, regenerating the bed of resin with an alkaline solution, and flowing additional quantities of said water through the regenerated bed.

9. A process as defined in claim 6 in which the carbohydrate reacted to prepare the resin is glucose.

10. A process as defined in claim 6 in which the carbohydrate reacted to prepared the resin is sucrose.

11. A process as defined in claim 6 in which the carbohydrate reacted to prepare the resin is starch.

12. A process as defined in claim 8 in which the carbohydrate is glucose and the reactants are condensed to produce a gel.

13. A process as defined in claim 8 in which the carbohydrate is sucrose and the reactants are condensed to produce a gel.

14. A process as defined in claim 8 in which the carbohydrate is starch and the reactants are condensed to produce a gel.

15. A cyclic process for removing anions from water comprising flowing water containing such anions through a bed of a granular water insoluble resin prepared by condensing a substantial quantity of a sugar with one mol of an amine of the group consisting of meta-phenylene diamine and the 5-alkyl derivatives thereof and with a substantial quantity of formaldehyde until a gel is produced, regenerating the resin with an electrolyte solution when its efficiency for removing anions from the water becomes impaired and flowing a further quantity of said water through a bed of the regenerated resin.

16. A process as defined in claim 15 in which the sugar is glucose.

17. A process as defined in claim 15 in which the sugar is sucrose.

ERIC LEIGHTON HOLMES.